United States Patent [19]

Burger et al.

[11] Patent Number: 4,539,059

[45] Date of Patent: Sep. 3, 1985

[54] METHOD OF MANUFACTURING CORROSION-RESISTANT MEASURING PROBES

[75] Inventors: Kurt Burger, Friolzheim; Heinz Friedrich, Gerlingen, both of Fed. Rep. of Germany

[73] Assignee: Robert Bosch GmbH, Stuttgart, Fed. Rep. of Germany

[21] Appl. No.: 513,975

[22] Filed: Jul. 14, 1983

[30] Foreign Application Priority Data

Aug. 24, 1982 [DE] Fed. Rep. of Germany ....... 3231345

[51] Int. Cl.³ .................. B32B 31/00; B29C 19/02; C09J 5/02; B23K 9/00
[52] U.S. Cl. ......................... 156/251; 156/69; 156/272.8; 156/275.1; 156/275.3; 156/275.7; 156/297; 156/300; 156/308.4; 219/121 LN; 219/121 LD
[58] Field of Search ................. 53/476, 478; 29/588–589; 265/25, 271.1, 272.11; 219/121 LG, 121 LN, 121 LC, 121 LD, 121 LE, 121 LF; 156/69, 251, 272.2, 272.8, 275.1, 275.3, 275.7, 297, 300, 308.2, 308.4, 311

[56] References Cited

U.S. PATENT DOCUMENTS

| | | | |
|---|---|---|---|
| 2,899,658 | 8/1959 | Bean, Jr. | 156/297 |
| 3,354,542 | 11/1967 | Mallia | 156/252 |
| 3,678,577 | 7/1972 | Weglin et al. | 156/251 |
| 3,996,092 | 12/1976 | Sarazin et al. | 156/300 |
| 4,167,662 | 9/1979 | Steen | 219/121 LN |
| 4,224,101 | 9/1980 | Tijburg et al. | 219/121 LN |
| 4,400,870 | 8/1983 | Islam | 219/121 LD |

OTHER PUBLICATIONS

Melcher, "Laser-Welded Package for Semi-Cond. and Super-Cond. Electron...", IBM Technical Disclosure Bulletin, 7/79, vol. 22, No. 2, p. 834.

*Primary Examiner*—Edward Kimlin
*Assistant Examiner*—Merrell C. Cashion, Jr.
*Attorney, Agent, or Firm*—Michael J. Striker

[57] ABSTRACT

A method of manufacturing a self-supporting measuring probe suitable for application in a highly corrosive environment such as for example in a muffler or suction channel of a motor vehicle, is disclosed. The probe is provided with a protective foil which is applicable on a rigid substrate carrying the measuring layers, by means of a heat sealing process in which heat and pressure are simultaneously applied on the foil. In a preferred embodiment, the edges of the foil are fused to the substrate by a laser beam.

3 Claims, 5 Drawing Figures

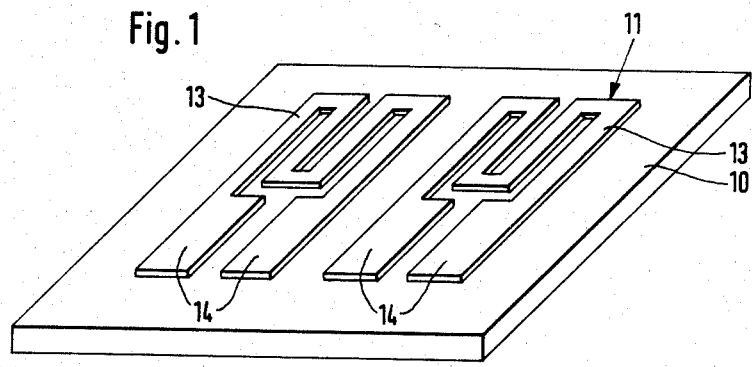
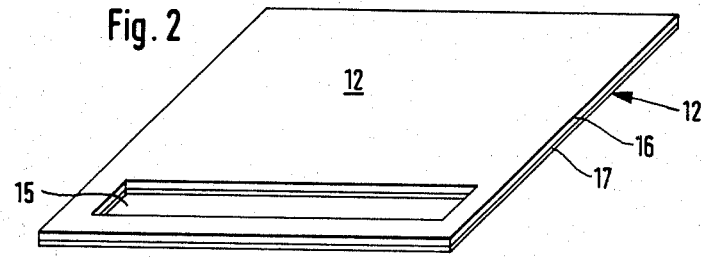
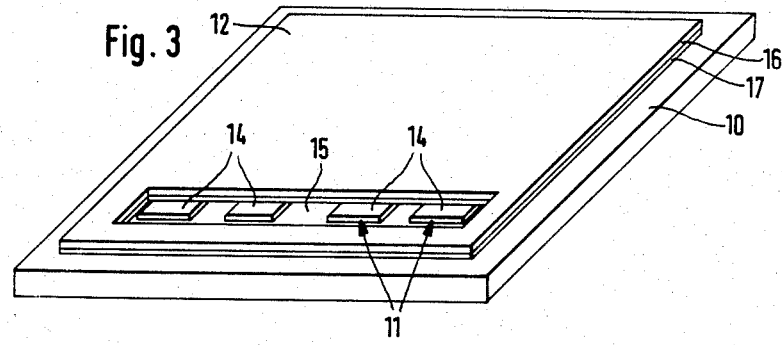

METHOD OF MANUFACTURING CORROSION-RESISTANT MEASURING PROBES

BACKGROUND OF THE INVENTION

The invention relates in general to manufacturing of a measuring probe suitable for application in highly corrosive environments, such as for example a suction channel or in the muffler of a motor vehicle. The measuring probe is of the type having a rigid support, a system of measuring layers arranged on the support for measuring gas and/or temperature of a streaming fluid, and a protective foil enclosing the layer system to protect the same against aggressive environment.

According to a known method for manufacturing probes of this type, it has already been devised in the German publication DE-OS No. 2,919,433 to enclose the layer system between two like plastic foils which are subsequently welded together. The resulting measuring probe is, however, not self-supporting and needs a mounting frame for support and fastening. In addition, a foil-like substrate of the sensing layers is mechanically loadable to a limited extent only and therefore is not applicable for higher mechanical loads.

SUMMARY OF THE INVENTION

It is therefore an object of the present invention to overcome the aforementioned disadvantages.

More particularly, it is an object of the invention to provide an improved method of manufacturing the measuring probes of the aforedescribed kind which results in a self-supporting arrangement of the probe having a high mechanical stability and resistance against aggressive environment and, at the same time, retains good sensor qualities, that is a fast response to changes of the environment. The probe can contain both resistance sensors as well as hybrid circuits with thin-layer elements and discrete component parts, the latter being additionally applied on the areas of the support which are not covered by the foil. The sensing layer which is to be protected by the foil can be either a thin-layer or a thick-layer structure.

A particular advantage of this invention, both in technological and economical senses, is the fact that the measuring probes need not be manufactured individually but the protective foil is first applied to a large-surface substrate which, in a subsequent step, is divided for example by a laser beam into the individual probes. During this separation step, the protective foil is simultaneously welded to the rims of the supporting material and thus a particularly safe seal of the marginal ranges is obtained. In comparison with prior art protective coatings, the method of this invention has the advantage that the thickness of the protective foil is exactly and uniformly reproducible, and consequently no variations in the response of the probe due to different thickness of the protective layer will result. This feature is of particular importance especially in the case of temperature probes where the response time must be uniform for all regions of the measuring surface and for all individual measuring probes. The thickness of the protective layer is determined by the thickness of the entire foil. Preferably, foils of a thickness greater than or equal to 12 microns are applied. The finished seal of the protective layer is moisture-proof and prevents oxidizing decomposition of the sensor and, by suitably selecting the material of the foil, it is chemically stable. Preferably, the foil is made of coated polyimide foil which can be used in temperature ranges between $-200°$ C. and $+250°$ C. The connection between the support and the protective foil is made according to a heat-sealing process by simultaneous application of heat and pressure. This processing step has proved to be simple and reliable with reduced production costs.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a perspective view of an example of a resistance measuring probe without a protective layer;

FIG. 2 is a perspective view of a protective layer of polyimide with two FEP coatings (TEFLON, tetrafluoroethylene);

FIG. 3 is a measuring probe with the applied protective foil;

DESCRIPTION OF THE PREFERRED EMBODIMENT

Figure 4:
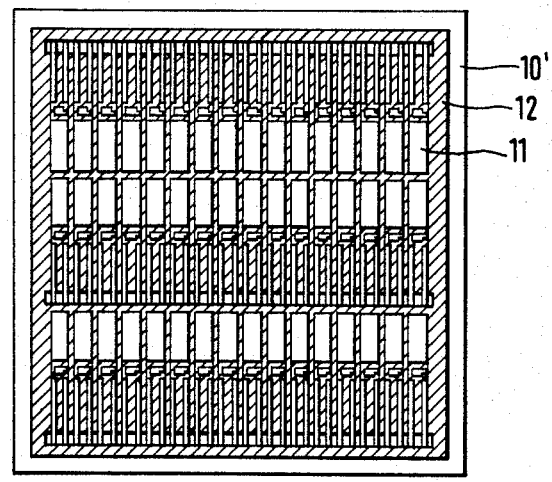
FIG. 4 shows a starting large-area support with a plurality of measuring layers and covered with a large-area foil before being divided into individual measuring probes according to the method of this invention.

In FIGS. 1-3, reference numeral 10 denotes a support on which a thin-layer sensor structure 11 is applied and coated with a protective foil 12. This arrangement represents a measuring probe which, due to its sturdy construction and upper surface protection, is suitable for application in a strongly corrosive environment, for example in a suction channel or in the muffler of a motor vehicle, or outside the body of a motor vehicle where, particularly in winter, it is subject to considerable corrosive effect. The illustrated measuring probe may be used for example for measuring mass and/or temperature of a streaming medium acting on the thin-layer sensors 11 from the side covered by the protective foil 12.

The protective foil 12 includes fusible material which is firmly applied on the upper surface of supporting wafer 10 by a heat sealing process, that is by exposing the foil simultaneously to heat and pressure. In this manner, the protective foil hermetically seals the entire measuring part of the thin-film system 11.

FIGS. 1-3 show an example of one embodiment of a measuring probe manufactured in accordance with the method of this invention. Two resistance measuring structures 13 are applied side-by-side on a supporting rigid wafer 10. Terminal webs 14 of each measuring structure 11 are arranged parallel to each other along one side of the support. Thereafter, a protective foil 12 formed with a rectangular cut-out 15 is laid on the measuring layers 11 in such a manner that the tips of terminals 14 are located in the cut-out 15. The foil 12 is made of a laminated material, namely of an upper polyimide foil 16 and an underlying FEP (TEFLON, tetrafluoroethylene) layer 17. The protective foil 12 is formed by cutting, punching or similar severing process in the illustrated configuration matching the size of support 10.

FIG. 3 illustrates the completed measuring probe in which the FEP layer 17 of foil 12 is placed on the support 10 and is heated by a conventional heat sealing device to a temperature of about 300° C. and compressed against the support 10. The FEP layer during the heat sealing process melts and penetrates partially into the upper surface of the support. The upper polyimide foil layer 16 is not plasticized and forms a uniformly thick protective layer.

Figure 5:
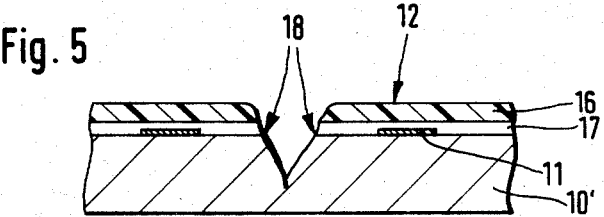
FIG. 5 is a sectional side view of a cut away part of the support of FIG. 4, shown on an enlarged scale and completed according to the method of this invention.

A preferred manufacturing method for measuring probes according to this invention is illustrated in FIGS. 4 and 5. According to this method, which is particularly time-saving and provides an improved seal of the edges of respective probes, a large-area supporting wafer 10' supports an array of measuring elements 11 which are covered by a large-area protective foil 12. Subsequently, the individual measuring units are separated from one another by means of a laser beam, as indicated in FIG. 5. During this separation, the edges 18 of the underlying foil layer 17 fuse with the upper surface of the support 10, whereby the critical marginal ranges of the probe are absolutely leakproof. Thereafter the separated probes are treated by the heat sealing process as described before. The supporting wafers 10 are made preferably of glass or ceramic. Applicable are also temperature-resistant plastic materials or metal wafers provided with insulating layer. In the latter case, metal substrate can be covered by insulating thin films of $SiO_2$, $Si_3N_4$, or $Al_2O_3$, for example. In another embodiment, thick-layer insulating coating can be used, such as for instance screen printed glass or oxide film plastic material, or combinations of different insulating layers.

By the method of this invention it is possible to produce in a very economical way measuring probes which are insensitive to corrosive atmospheres and permit a simple and reliable installation. Even when used in corrosion-stimulating locations, such as for example in mufflers of motor vehicles, the measuring probes produced according to this invention guarantee a long service life. The thin-layer measuring structure which may for example be metallic resistance layers 13, are hermetically sealed by the protective layer 12, which eliminates any effect of the aggressive environment. Consequently, no measuring error can occur due to accidental deposition of electrically conductive ambient atmosphere, the structure of the measuring resistance layers 13 is not subject to any changes due to corrosion, and no galvanic decomposition of the measuring layers can occur. At the same time, the sealing protective layer can be made sufficiently thin so that problem-free and fast response of the sensors is maintained. In the case of temperature-sensing probes, heat transfer between the ambient medium and the resistance layers 13 is hindered only negligibly, and the sensors quickly respond to the temperature changes. As mentioned before, the protective foil is made preferably of a polyimide material which can additionally be coated by fluorohydrocarbons.

The method of this invention is applicable for manufacturing both thin-film and thick-film measuring probes, inasmuch as no leakage occurs at the transition zone between the substrate 10 and the measuring layers 11. After the completion of the measuring zone, the terminal surfaces 14 are tin-plated or soldered, and operational steps such as adhesion of other component parts can be made after the application of the protective foil to the substrate. For the soldering or cementing of additional component parts, the foil 12 is in advance provided with a corresponding cut-outs. From the manufacturing point of view, foils of a thickness of 12 microns are preferred. Such foils of a uniform thickness are commercially available and also devices for heat-sealing are generally known and need not be described in detail.

It will be understood that each of the elements described above, or two or more together, may also find a useful application in other types of constructions differing from the types described above.

While the invention has been illustrated and described as embodied in connection with a resistance measuring probe, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method of manufacturing a measuring probe of the type having a rigid support, a system of measuring layers arranged on the support, and a protective foil sealingly covering the measuring layers to protect the same against aggressive environment, comprising the steps of arranging a plurality of measuring layer systems on a large-area support; providing a large-area protective foil with a lower layer of thermoplastic material; then coating the layer systems, with the protective foil; then cutting with a laser beam a thus-formed multi-layer structure including the support, the measuring layer systems arranged on the support, and the protective foil, so that the laser beam simultaneously separates the individual measuring probes from one another and hermetically seals the edges of the separated protective foil portions to the upper surface of the support; and subsequently attaching the foil portions to the support by a heat-sealing process during which the foil portions are subject simultaneously both to heat and pressure.

2. A method as defined in claim 1, wherein the support is made of glass or ceramic or rigid plastic material.

3. A method as defined in claim 1, wherein the support is made of a metal substrate coated with an insulating layer.

* * * * *